Oct. 31, 1933.                G. E. FARLEY                1,933,103
                              PRESSURE GAUGE
                            Filed June 10, 1929
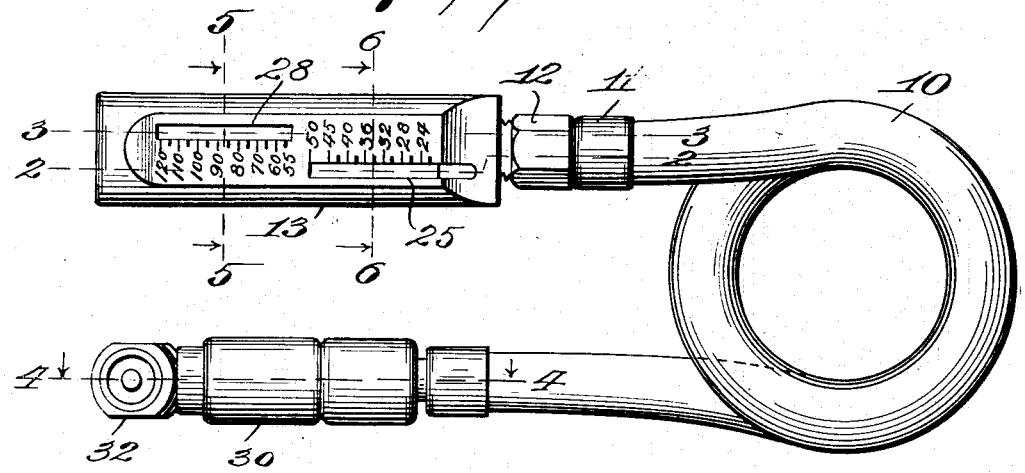
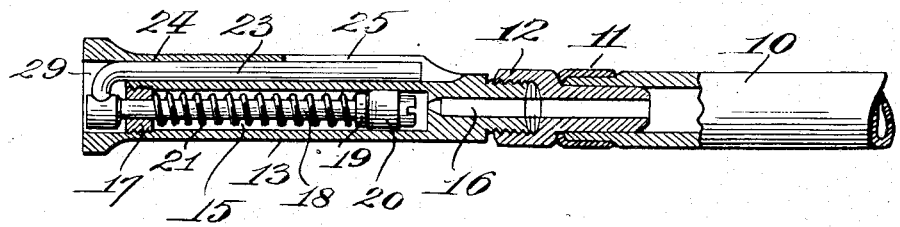
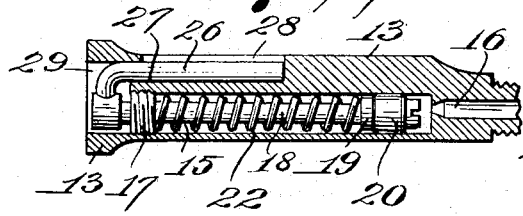 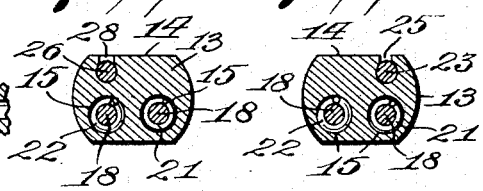
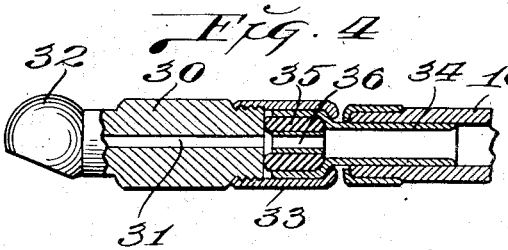 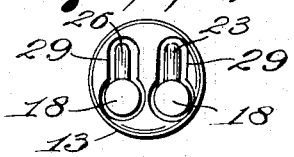
INVENTOR:—
GEORGE E. FARLEY.
By Martin P. Smith, ATTY.

Patented Oct. 31, 1933

1,933,103

UNITED STATES PATENT OFFICE 1,933,103

PRESSURE GAUGE

George E. Farley, South Gate, Calif., assignor to Service Equipment Company, South Gate, Calif., a corporation of California Application June 10, 1929. Serial No. 369,637

8 Claims. (Cl. 73—111)

My invention relates to a pressure gauge and has for its principal object, the provision of a relatively simple, practical and inexpensive device that may be conveniently used for accurately ascertaining the degree of fluid pressures, for instance, the pressure of air in pneumatic tires.

The structure herein set forth is an improvement upon the tire pressure gauge forming the subject matter of my copending application for U. S. Letters Patent, filed December 28th, 1927, Serial No. 243,140.

Further objects of my invention are, to generally improve upon and simplify the construction of the pressure gauge disclosed in my aforesaid copending application, as well as other existing forms of pressure gauges, further, to provide a gauge that has comparatively few operating parts and which will accurately register the degrees of fluid pressure in the inflated device to which it is applied, and further to provide a pressure gauge that is very compact, so that it may be conveniently carried in the pocket or packed for storage within a comparatively small space.

A further object of my invention is, to provide a pressure gauge that will accurately indicate pressures throughout a relatively wide range without increasing the size or length of the body of the gauge or its operating parts and to accomplish this result the gauge is constructed with two or more spring held movable members that act in sequence and which cooperate with graduated scales on the external surface of the body of the gauge in registering the degrees of pressure throughout a comparatively wide range.

A further object of my invention is, to provide a pressure gauge that is especially designed for use in gauging the pressures in pneumatic tires and which gauge is equipped with a swivelled filling nipple engaging member that greatly facilitates the application of the gauge to the filling nipple or stem that projects from the pneumatic tire or other air inflated member.

With the foregoing and other objects in view, my invention consists in certain novel features of construction and arrangement of parts that will hereinafter be more fully described and claimed and illustrated in the accompanying drawing, in which:

Fig. 1 is a top plan view of a pressure gauge constructed in accordance with my invention.

Fig. 2 is a vertical longitudinal section taken on the line 2—2 of Fig. 1.

Fig. 3 is a vertical longitudinal section taken on the line 3—3 of Fig. 1.

Fig. 4 is a vertical longitudinal section taken on the line 4—4 of Fig. 1.

Fig. 5 is a cross section taken on the line 5—5 of Fig. 1.

Fig. 6 is a cross section taken on the line 6—6 of Fig. 1.

Fig. 7 is an end elevational view of the body of the gauge that carries the pressure actuated gauge members and the graduated scales.

Referring by numerals to the accompanying drawing which illustrates a practical embodiment of my invention, 10 designates a short section of flexible tubing such as is ordinarily used for conducting fluids under pressure and secured in any suitable manner to one end of this flexible tube is a short tubular connection or nipple 11, the outer end portion of which is internally threaded.

Screw seated in the threaded outer portion of this nipple is a short threaded stem 12 that projects from one end of gauge body 13, of metal and which may be either square or round in cross section.

I prefer to form this gauge body from light weight metal such as aluminum and said body is provided with two or more externally arranged flat faces, one of which, designated by the numeral 14, functions as the front or top face of the gauge and has formed thereon the graduated scales that are utilized in reading the pressures when the gauge is applied for use.

Formed in the lower portion of the body 13 is a pair of longitudinally disposed parallel chambers 15, the rear or inner ends of which communicate with the axial opening 16 through stem 12, and screw seated in the outer end portions of the chambers 15 are bushings or collars 17. Arranged for sliding movement within the chambers 15 and through the bushings 17 are plungers 18, and secured on the inner or rear ends thereof are heads 19 with which are associated cup leather packings 20.

Arranged on one of these plungers 18, between its head and bushing, is a spring 21, the tension of which is such as to yieldingly resist fluid pressures throughout a given range, for instance, from twenty to fifty pounds, and similarly mounted on the other one of the plungers is a heavier spring 22, the tension of which is such as that it will yieldingly resist the force of fluid pressures throughout a given range, for instance, from fifty to one hundred and twenty-five pounds or higher.

Secured to the forward end of plunger 18, with which is associated the lighter spring 21, is the forward end of a gauge rod 23 which occupies a bore 24 that is formed in the body 13 directly above the chamber that is occupied by said plunger 18 and lighter spring and said rod 23 occupies a position parallel with the plunger to which it is connected.

Formed through the upper portion of the body 13, directly above the inner portion of the bore 24, is a longitudinally disposed slot 25 that exposes the inner portion of rod 23 while the same is in normal position and arranged on the upper face of said body 13 to the side of this slot 25 is a series of graduated marks that are numbered in sequence, for instance, from twenty to fifty, thereby forming a scale by means of which low pressure readings may be obtained as the gauge rod 23 is moved outwardly under fluid pressure passing into the gauge.

Secured to the outer end of plunger 18 that has associated therewith the comparatively heavy spring 22 is the outer end of a gauge rod 26 that lies parallel with said plunger and said gauge rod occupies a bore 27 that is formed in the forward portion of body 13 directly above the bore or chamber 15 that is occupied by the corresponding plunger 18 and the heavier spring 22.

Immediately above the bore 27 the top portion of body 13 is cut away to form a longitudinally disposed slot 28, through which the gauge rod 26 is readily visible, and owing to the parallel positions of the plungers 18 and their gauge rods the slots 28 and 25 lie parallel with each other, but they are offset longitudinally of the gauge body.

The inner end of slot 28 is spaced a short distance away from the outer end of slot 25 longitudinally of the gauge body in order that the end of gauge rod 23 will pass entirely beyond the outer end of slot 25 before the inner end of the gauge rod 26 begins to move substantially outwardly through bore 27 and slot 28 while the gauge is in use.

Appearing on the upper face of the body of the gauge to the side of the slot 28 is a series of graduated marks that are numbered, for instance, from fifty-five to one hundred and twenty, thus providing a visible scale which with the cooperation of the gauge rod 26 enables high pressure readings to be taken while the gauge is in use. Under normal conditions, or while the gauge is not in use the outer ends of the plungers 18 and the gauge rods 23 and 26, carried thereby, occupy recesses 29 that are formed in the outer end of the gauge body 13 and which recesses connect the outer ends of the chambers 15 with the forward ends of the bores 24 and 27 (see Fig. 7).

Mounted on the hose or flexible tubing 10, opposite the end that carries the gauge body 13 is a member that is adapted to be applied to the end of the filler valve tube that projects from the pneumatic tire or other inflatable object and in order that this member may be easily and conveniently applied to the end of the filler tube I construct and mount the same so that it has swivelled upon the end of the flexible tube 10.

This swivelled member comprises a body 30 having an axial passageway 31 and which latter communicates with a chamber that is formed in a head 32, the latter being formed integral with the outer end of the body 30 and said head being recessed in order to receive the end of the filling valve tube or nipple.

The inner end of body 30 is screwseated in a short tubular member 33, which latter is mounted to rotate freely upon the outer end of a tube 34, which latter is clamped in any suitable manner in the end of tube 10 opposite the end that carries the gauge body 13.

Arranged within that portion of the tubular member 34 that is enclosed by a swivelled member 33 is a bushing 35 of rubber or analogous elastic material and extending axially through said bushing is a small metal tubing 36.

The outer end of the rubber bushing 35 projects a short distance beyond the corresponding ends of the tubular member 34 and the tube 36 and thus when member 30 is screwed into member 33 the inner face of said member 30 which is formed of metal makes direct contact with the outer end of the rubber bushing and consequently producing a leak proof joint.

In the use of the device for obtaining a reading of fluid pressure in an inflated member such as a pneumatic tire the head 32 on swivelled member 30 is applied to the end of the tubular filling nipple that projects from the tire or other inflated object and as the valve within the filling nipple is unseated fluid pressure from the tire or other inflated member will pass through duct 31, tubular members 36 and 34 and thence through the flexible tube or hose 10 to the gauge and this fluid pressure, after passing through the tubular member 11 and duct 16 enters the chambers 15 that are occupied by the plungers 18.

As the fluid pressure enters the chamber that is occupied by the plunger having the relatively light spring 21, said fluid pressure entering behind the cup leather packing 20 will force the plunger forwardly through its chamber against the resistance offered by the comparatively light spring 21 and as such action takes place the gauge rod 23 will move forwardly through its bore 24 and the rear end of said gauge rod will move forwardly past the graduated marks of the scale located adjacent to slot 25.

If the pressure of the fluid in the inflated member that is being tested is less than fifty pounds or the highest mark on the scale adjacent to slot 25, the reading of the fluid pressure may be readily taken from the scale adjacent to slot 25 for by noting the number of the graduated mark on said scale opposite the end of the gauge rod 23 which is readily visible through slot 25 the amount of the pressure in the inflated member that is being tested may be readily ascertained.

If the pressure of the fluid in the member that is being tested is greater than fifty pounds or the amount indicated by the highest number on the scale adjacent to slot 25, then the reading of the higher pressure will be obtained from the scale that is located to the side of the slot 28.

The outer end of slot 25 is offset longitudinally relative to the inner end of slot 28 a distance which may correspond to five or ten pounds, as indicated by the graduated marks of the two scales, and as a result of this offset arrangement of the adjacent ends of the slots, the end of gauge rod 23 will pass entirely beyond the outer end of slot 25 before the gauge rod 26, that is carried by the plunger having the heavier spring, begins to move outwardly under higher degrees of fluid pressure.

In the use of the device after the end of gauge rod 23 passes out of sight beyond the outer end of slot 23, the higher pressure will act against the cup leather packing 20, carried by the plunger having the heavier spring 22, and said plunger will be moved outwardly and in like manner the gauge rod 26 will be moved outwardly during which action the movement of said gauge rod may be readily observed through slot 28.

At the termination of the outward movement of the gauge rod 26, the position of its end relative to the graduated marks of the adjacent scale may be readily noted, and thus a reading of the numbered mark opposite the end of the gauge rod 26 will give the pressure of the fluid in the inflated member that is being tested.

Upon removing the head 32 of the swivelled body 30 from the valve stem the valve within said stem will close and the springs 21 and 22 will return the plungers and the gauge rods associated therewith to their normal positions.

By swivelling member 30, that carries the filling valve nipple 32, the application of the pressure gauge to the filling nipple is greatly facilitated for the body 30 that carries the said head 32 may be readily turned in either direction to conveniently engage the nipple by constructing the device so that the inner end of body 30, which is of metal, makes direct contact with the bushing 35 of rubber, a fluid pressure tight bearing within the swivelled structure is produced and by arranging the small metal tube 36 within the bushing the latter is prevented from collapsing when compressed as the body 30 is screwed into tubular member 33.

Thus it will be seen that I have provided a pressure gauge that is relatively simple in construction, inexpensive of manufacture and very effective in performing the functions for which it is intended.

By utilizing a plurality of parallel plungers and associating therewith springs of different tension, the relative size and particularly the over all length of the body in which said plungers are arranged is minimized and a very compact and convenient structure is produced.

Where a gauge for a limited range of low, intermediate or high pressures is desired the gauge body 13 may be provided with a single spring pressed plunger and the gauge rod that is associated therewith and where such construction is employed the plunger is located in the longitudinal center of the gauge body 13, thereby enabling the latter to have a relatively small diameter.

It will be understood that minor changes in the size, form and construction of the various parts of my improved pressure gauge may be made and substituted for those herein shown and described without departing from the spirit of my invention, the scope of which is set forth in the appended claims.

By the expression "pressure gauging members" as used in the claims is meant those members, namely plungers 18, pistons 20 and gauge rods 23 and 26, which constitute the movable elements of the device.

I claim as my invention:

1. In a tire pressure gauge, a flexible tube, a gauge carried by one end thereof, a tubular member seated in the other end of said tube, a filling nipple engaging member swivelled on the projecting end of said tubular member and a compressible gasket arranged between said tubular member and said swivelled filling nipple engaging member.

2. In a tire pressure gauge, a flexible tube, a gauge carried by one end thereof, a tubular member seated in the other end of said tube, a filling nipple engaging member swivelled on the projecting end of said tubular member, a compressible gasket arranged between said tubular member and said swivelled filling nipple engaging member and a non-compressible tube extending axially through said compressible gasket.

3. In a gauge for indicating pressures throughout a comparatively wide range, a gauge body having openings therein, a plurality of independently operating pressure gauging members arranged side by side for reciprocation in said gauge body, portions of which gauging members are visible through said openings in said gauge body, said gauging members being adapted to be moved by fluid under pressure, springs of different tension resisting movement of said pressure gauging members, a graduated scale upon said gauge body adjacent each of said openings whereby the degree of movement of the gauging members is ascertained, said body also being provided with a common passageway whereby said pressure gauging members are subjected to common pressure.

4. In a gauge for indicating fluid pressures throughout a relatively wide range, a gauge body provided with a plurality of communicating passageways, a plurality of independently operating pressure gauging members arranged side by side for reciprocation within said communicating passageways, a plurality of springs of different tension within said passageways for resisting movement of said pressure gauging members, a common inlet for said passageways, said body having openings through which portions of the pressure gauging members are visible, said openings being offset longitudinally relative to each other, said body being provided with graduated scales adjacent to the openings therein whereby the degree of movement of said pressure gauging members is ascertained.

5. In a gauge for indicating fluid pressures throughout a relatively wide range, a gauge body provided with a plurality of communicating passageways, a plurality of independently operating pressure gauging members arranged side by side for reciprocation within said passageways, a plurality of springs of different tension within said passageways for resisting movement of said pressure gauging members, a common inlet for said passageways, said body having openings through which portions of the gauging members are visible, said openings being offset relative to each other transversely and longitudinally of said body, said body being provided with graduated scales adjacent to the openings therein whereby the degree of movement of said pressure gauging members is ascertained.

6. In a gauge for indicating fluid pressures throughout a relatively wide range, a gauge body provided with a plurality of communicating passageways, a plurality of gauge members arranged side by side for independent movement in said communicating passageways, said passageways having a common inlet, a spring associated with each gauge member for resisting its outward movement, said springs being of different tensions, said gauge body being provided with openings through which portions of the gauge members are visible during their outward travel through the gauge body, calibrated indicia upon said gauge body adjacent said openings whereby the degree of movement of said gauging members is ascertained.

7. In a gauge for indicating fluid pressures throughout a relatively wide range, a gauge body provided with a pair of communicating passageways, a pair of spring resisted gauge members arranged side by side for reciprocatory movement within said communicating passageways, said passageways having a common inlet, said springs being of different tension, said body being provided with openings through which portions of said gauge members are visible during their travel in said body, said body having graduated scales adjacent to the openings therein and said openings and graduated scales being offset with respect to each other transversely and longitudinally of said gauge body whereby the degree of movement of said gauge members is ascertained.

8. In a gauge for indicating fluid pressures throughout a relatively wide range, a gauge body provided with a plurality of communicating passageways, a plurality of independently operable differently tensioned spring held gauge members arranged side by side for operation within said communicating passageways, said body being provided with an opening through which portions of said gauge members are visible, and means upon said body for ascertaining the degree of movement of said gauge members.

GEORGE E. FARLEY.